April 26, 1960      J. S. CHRISTIE      2,934,172
LIGHT TRANSMISSIVE COLOR STANDARD
Filed March 9, 1955      3 Sheets-Sheet 1
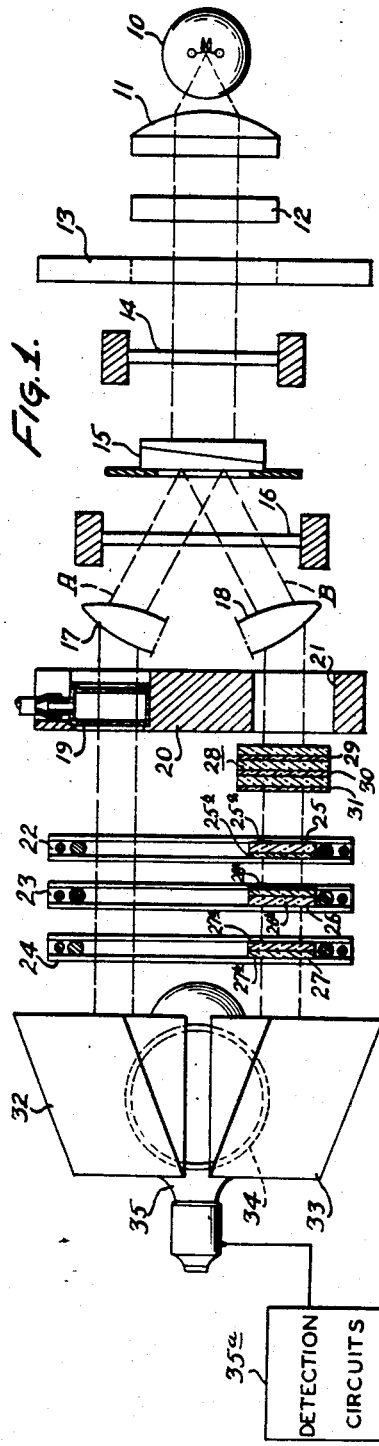
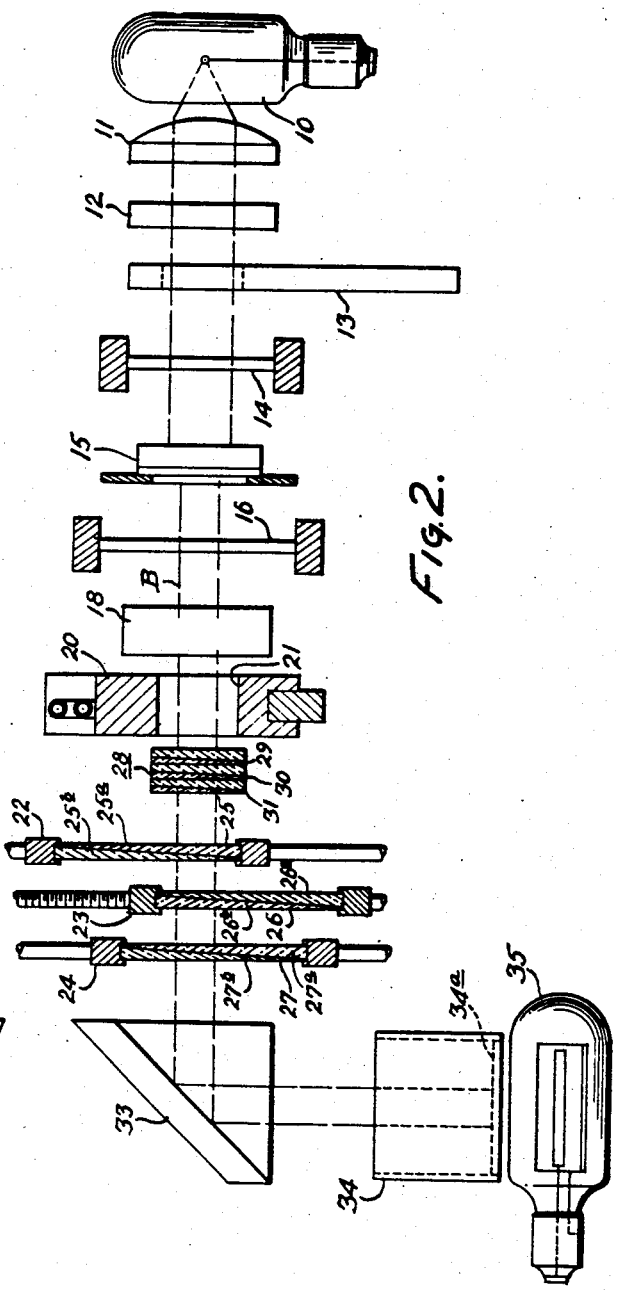
Inventor:
John S. Christie
by Howson & Howson
Attys.

April 26, 1960  J. S. CHRISTIE  2,934,172
LIGHT TRANSMISSIVE COLOR STANDARD
Filed March 9, 1955  3 Sheets-Sheet 2

Inventor:
John S. Christie
by Howson & Howson
Attys.

April 26, 1960  J. S. CHRISTIE  2,934,172
LIGHT TRANSMISSIVE COLOR STANDARD
Filed March 9, 1955  3 Sheets-Sheet 3

Inventor:
John S. Christie
by Howson & Howson
Attys.

United States Patent Office 2,934,172
Patented Apr. 26, 1960

2,934,172

LIGHT TRANSMISSIVE COLOR STANDARD

John S. Christie, Oreland, Pa., assignor to Proctor & Schwartz, Inc., Philadelphia, Pa., a corporation of Pennsylvania Application March 9, 1955, Serial No. 493,229

2 Claims. (Cl. 88—14)

This invention relates to light transmissive color standards for use in color comparator systems which are adapted to determine color characteristics of a light transmissive medium or substance.

An example of such a testing system as employed in the past is the so-called tri-stimulus color comparator system manufactured by General Electric Company. Such a system determines quantitatively primary color components present in a test sample of a light-transmissive medium or substance whose color it is desired to determine in comparison to a standard. This is accomplished by providing two light beams and by comparing the light transmission in one beam through the test sample with the light transmission in the other beam through a color standard, for each of the primary colors employed. A useful application of such a comparator system is the color testing of a dye solution by comparison of light transmission through a sample of the dye solution with light transmission through a standard at selected points in the visible spectrum, for example at three points corresponding respectively to red dye, yellow dye, and blue dye, all of which have minimum transmission points at different places in the spectrum. A rotating filter wheel is employed, which has a monochromatic filter for each dye to transmit only the wave-lengths for controlling that dye (or color). In practice, the dye solution to be tested may be circulated through a test cell.

In the above-mentioned system, the standard employed is a cell containing a solution of dye of the desired color. This has not been completely satisfactory for a number of reasons. In the first place, the accuracy of the color testing depends upon the accuracy with which the standard solution is prepared. In the second place, there are problems of stability of such standard dye solutions with time due to the deteriorating action of light, oxidation and the elevated temperatures used in the circulated dye solution. The standard must be maintained at the same temperature as the circulated dye solution in order not to introduce errors due to changes of light transmission with temperature. And unless the standard is replaced often, it will deteriorate with use due to the effects of light and oxidation.

The principal object of the present invention is to overcome the objections and disadvantages incident to the use of a standard solution in a system of the character above mentioned.

Another object of this invention is to provide a greatly superior color standard.

In accordance with this invention, a color standard is provided which comprises a plurality of light-transmissive units arranged in succession for passage of light successively therethrough, each of said units comprising a plate of uniform thickness formed of two complemental solid sections of oppositely varying thickness secured together, one of said sections being composed of clear material and the other of said sections being composed of colored material, the colored sections of said units being respectively different in color, and means for individually adjusting said units with respect to the light passage therethrough so as to simulate different color mixtures.

The invention may be clearly understood from the following detailed description with reference to the accompanying drawings, in which Fig. 1 is a generally diagrammatic plan view of a comparator system of the type above mentioned with the present invention incorporated therein;

Fig. 2 is a similar elevational view of the system;

Figure 3:
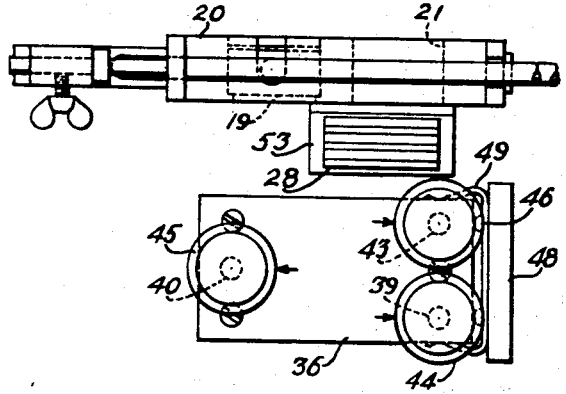
Fig. 3 is a plan view of the preferred structural embodiment of a color standard according to this invention.

Referring first to Figs. 1 and 2, the old elements of the system are shown diagrammatically, and for the present purpose, it will be necessary to describe the system as a whole only to the extent requisite for a clear understanding of this invention.

In this system, light from a source 10 is converged into a parallel beam by condensing lens 11, and passes through a heat-absorbing element 12. The light beam then passes through a color filter wheel or disk 13 which is driven at constant speed and which, in the case of a tri-color system, has three monochromatic filters arranged to be brought successively and sequentially into the path of the light beam. In the system presently employed, the color filter wheel is driven at a speed of 5 r.p.m., but it may be driven at any suitable speed. The light beam next passes through a partially polarizing filter 14 which is rotationally adjustable for a reason which will appear presently. The beam next passes through a Wollaston prism 15 which splits the beam into two divergent light beams A and B, and which also plane polarizes the beams so that beam A is polarized in a plane inclined at 45° to the right of vertical and beam B is polarized in a plane inclined at 45° to the left of vertical. Element 16 is a rotating polarity-responsive filter whose plane of polarization rotates. When its plane of polarization is parallel to the plane of polarization of either beam path A or beam path B, it passes a maximum amount of the light of that beam; and when its plane of polarization is at right angles to the plane of polarization of either beam A or beam B, it does not pass any of the light from that beam. At other angles, the light passed is proportional to the sine of the angle. Due to the rotation of the polarity-responsive filter 16, the intensity of the light in each beam reaches a maximum and a minimum twice during each revolution, and since the two light beams are plane polarized 90° apart, there is a 90° time or phase relation between the beams. Thus the two beams may be represented as sine waves with a 90° time or phase displacement between them.

Element 15 may be a Nicol prism, but in the system now being employed it is composed of two glass plates with a plastic or gelatin based polarizing filter element sandwiched between them. In the system now being employed, element 16 is mounted in a large diameter ball bearing and is driven through a toothed belt by a synchronous motor to insure synchronous speed. However, it could be mounted directly in a hollow shaft synchronous motor.

The divergent beams are converted to parallel beams by segmented cylindrical lenses 17 and 18. Beam A then passes through a cell 19, a sample holder through which the dye solution being tested is circulated. Cell 19 is mounted in a block 20 which has an aperture 21 through which the beam B may freely pass. In prior systems employing a color standard, the second beam B was passed through a standard cell containing dye solution of the desired color. As previously stated, this has been objectionable for a number of reasons, and the principal purpose of the present invention is to overcome the objections and disadvantages incident thereto.

In accordance with this invention, three units 22, 23 and 24 are provided which comprise respectively adjustable plates 25, 26, and 27. While these plates may be disposed as shown, it would be preferable to have them in the same plane as cell 19, so as to make the optical paths of the two beams more nearly alike. Each of these plates is of uniform thickness and is formed of two complemental solid sections of oppositely varying thickness having planar meeting surfaces extending diagonally of the plate thickness and secured together at said surfaces, one of said sections being composed of clear material and the other of said sections being composed of colored material, the colored sections of the plates being respectively different in color. Thus plate 25 has a colored section 25a and a clear section 25b; plate 26 has a colored section 26a and a clear section 26b; and plate 27 has a colored section 27a and a clear section 27b. These places may be formed of glass segments cemented together along the diagonal plane. The respective colors of the colored segments may be red, yellow and blue. It will be seen that each plate is a color filter, with color density increasing from one end to the other. As hereinafter described, the plates are individually adjustable to simulate compositely the desired color, shade and hue of the dye solution.

It will be seen that the transmitted light of beam B will not be of uniform intensity at all points in the light beam, as the transmittance of the filter plates is greater toward the thin end of the tapered colored section. It is preferable to correct this by first passing the beam through a set of three similar compensating filter plates with tapered colored sections arranged in opposite relation to those of plates 25 to 27. Thus there is preferably provided a compensating unit 28 having differently colored tapered sections 29 to 31 which taper in the opposite direction from the colored sections of plates 25 to 27. Unit 28 may be formed as a block with tapering clear sections and the tapered colored sections cemented together to form the block.

After passing respectively through the sample cell 19, and the color standard comprising plates 25 to 27, the two light beams A and B are re-directed convergently downward by tilted prisms 32 and 33 through tube 34 onto a ground glass disk 34a at the bottom of said tube. If the light transmissions in the two beams A and B are equal, the illumination on the disk is substantially constant, because the light intensity of one beam decreases as that of the other beam increases, and vice versa. However, unequal transmission in the two beams A and B causes light pulses which produce an output from phototube 35, which in turn activates detection circuits 35a. The latter may simply give an indication of the unbalanced condition and/or may control a valve to add dye stuff to the solution under test so as to increase its concentration.

In the system presently employed, element 16 is conveniently driven at a speed of 1800 r.p.m., a speed easily available from the 60 cycle per second frequency of the supply line from which the electrical circuits are operated. Thus the pulsating output of the phototube 35, when such output occurs, is synchronized with the supply current. This is useful in operation of the detection circuits. For example, the output of phototube 35 could be applied to a cathode ray tube whose sweep is controlled from the supply line. However the present invention is not concerned with the electrical system.

Mention was previously made of the adjustable element 14. Because the system is sensitive to very small differences in light reaching the ground glass disk 34a from beams A and B, it is desirable to balance the beams beforehand by means of element 14. This may be done by removing the sample cell 19 and the color standard elements, and then adjusting element 14 until there is no output from phototube 35. However this does not compensate for possible changes in the sample cell and/or collection of dust or dirt on the surface of the sample cell and the color standard elements. Another method is to place clear water in the sample cell and adjust the color standard elements to their maximum transmission points, and then adjust element 14 for zero output from the phototube.

Figure 4:
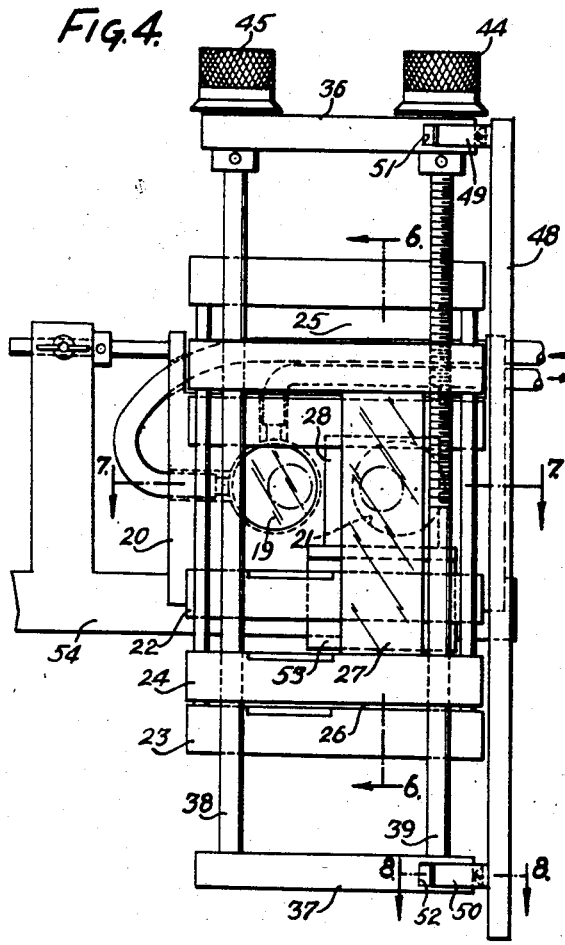
Fig. 4 is an elevational view of the color standard looking at the same from the front as viewed in Fig. 3.
Figure 5:
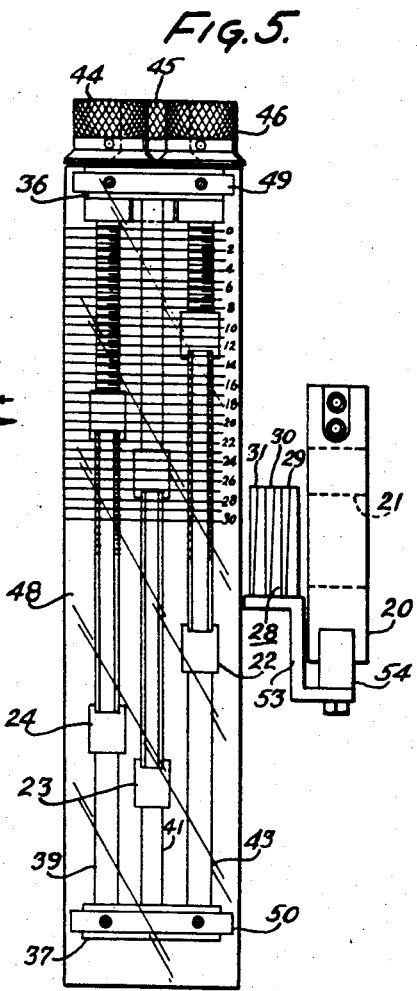
Fig. 5 is an elevational view of the color standard taken from the right side of Fig. 4.
Figure 6:
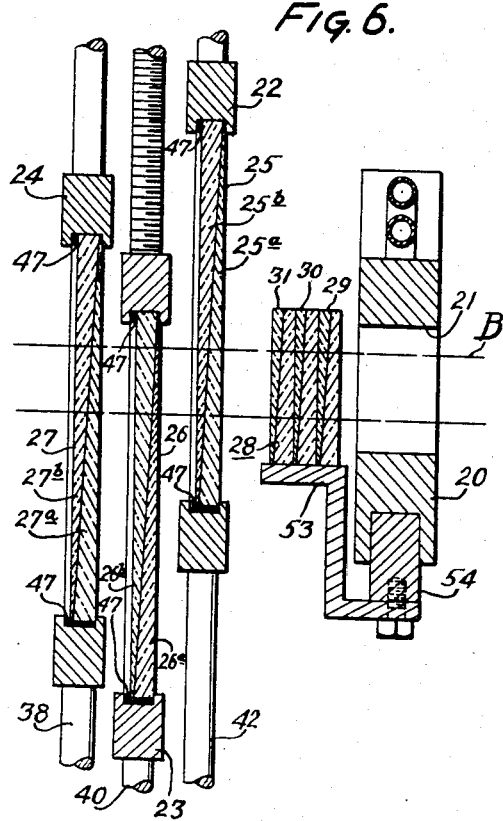
Fig. 6 is a sectional view taken along line 6—6 of Fig. 4.
Figure 7:
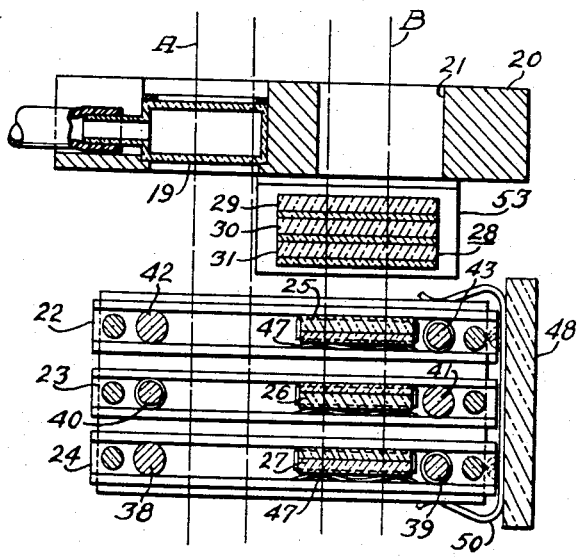
Fig. 7 is a sectional view taken along line 7—7 of Fig. 4.

Referring now to Figs. 3 to 9, there is shown a preferred structural embodiment of the color standard provided by this invention. The three units 22 to 24 shown in Figs. 1 and 2 are embodied in a single assembly as shown in Figs. 4, 5 and 7. This assembly comprises a pair of spaced supports 36 and 37 which may be in the form of plates vertically spaced as shown. Three pairs of rods (see particularly Fig. 7) 38—39, 40—41, and 42—43 extend between the supports 36 and 37. Rods 38, 41 and 42 are unthreaded and are non-rotatably secured to the supports 36 and 37. Rods 39, 40 and 43 are threaded and are rotatably supported by the supports. As may be seen in Figs. 3 to 5, these rotatable threaded rods are provided respectively with operating knobs 44, 45 and 46, by means of which these rods are individually rotatable.

Figure 9:
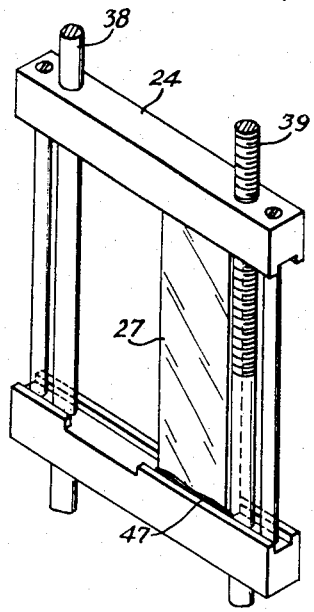
Fig. 9 is a perspective view of one of the frames employed in the color standard provided by this invention.
Figure 8:
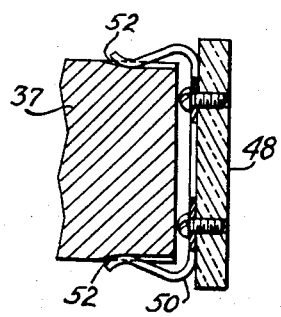
Fig. 8 is a fragmentary sectional view taken along line 8—8 of Fig. 4.

Each of the units 22 to 24 comprises a frame, as clearly shown in Fig. 9, for supporting the filter plate. The three frames are supported respectively by the three pairs of rods. Each frame is freely slidable along the unthreaded rod, but is threadedly engaged by the threaded rod, so that rotation of the latter rod causes vertical movement of the frame. The filter plates 25 to 27 are supported respectively by the three frames. As may be seen in Figs. 6 and 9, the upper and lower members of each frame are recessed to slidably receive the filter plate to be supported, and the plate is firmly held by means of leaf springs 47.

A transparent plate 48 is removably attached to the supports 36 and 37, as by means of spring clips 49 and 50 secured to plate 48 and adapted to seat in recesses 51 and 52 provided in the supports 36 and 37. As may be seen in Fig. 5, plate 48 has indicia thereon to indicate the adjustments of the three filter plates. The indicia may be in the form of numbered lines, as shown in Fig. 5, representing various degrees of concentration. By this arrangement, the concentrations of the three primary colors may be relatively adjusted so as to set up the standard having the desired concentration of each color. The adjustment of each unit may be effected by aligning the upper edge of its frame with one of the index lines.

The compensating unit 28, hereinbefore described, if used, may be mounted in any suitable manner in proper relation to the color standard assembly. In the illustrated arrangement, unit 28 is mounted on a bracket 53 which is secured to a support 54 on which block 20 is supported.

The color standard provided by this invention enables the setting up of an exact standard which remains constant and which does not have the disadvantages of a liquid standard. The three filter plates may be exactly formed, and they may be precisely adjusted to give the desired concentrations of the primary colors to set up the desired standard.

I claim:

1. A light transmissive color standard for use in a color comparator, comprising a pair of spaced supports, a plurality of pairs of rods extending between said supports and disposed in different adjacent planes, one rod of each pair being unthreaded and being non-rotatively secured to said supports, the other rod of each pair being threaded and being rotatably supported by said supports, a plurality of frames supported by the respective pairs of rods, each frame being threadedly engaged by the associated supporting threaded rod, whereby rotation of each threaded rod causes movement of the associated supported frame, a plurality of light-transmissive plates carried respectively by said frames, said plates comprising differently-colored elements of varying thickness arranged to successively transmit a light beam, and a transparent plate having indicia thereon supported by said supports adjacent one side of said frames, for observation of the positioning of said plates.

2. The light transmissive color standard of claim 1 in which the light transmissive plates are formed of two complemental solid sections having planar meeting surfaces extending diagonally of the plate thickness, and the plates are arranged in succession within the frame for passage of a beam of light successively therethrough, each of the plates being composed of one clear and one colored section, the colored sections being respectively different in color from one another.

References Cited in the file of this patent

UNITED STATES PATENTS

| | | |
|---|---|---|
| 1,505,185 | Badollet et al. | Aug. 19, 1924 |
| 1,775,148 | Twyman et al. | Sept. 9, 1930 |
| 1,898,219 | Sharp | Feb. 21, 1933 |
| 2,045,124 | Cummins et al. | June 23, 1936 |
| 2,328,461 | Kienle et al. | Aug. 31, 1943 |

FOREIGN PATENTS

| | | |
|---|---|---|
| 804,407 | France | Aug. 3, 1936 |
| 883,607 | France | Mar. 29, 1943 |
| 812,967 | Germany | Sept. 6, 1951 |

OTHER REFERENCES

Myers: "A Colorimeter for Bicolorimetric Work," The Journal of Biological Chemistry, vol. LIV, No. 4, 1922, pages 675–682. (Copy in Patent Office Library.)

UNITED STATES PATENT OFFICE
CERTIFICATE OF CORRECTION

Patent No. 2,934,172 April 26, 1960

John S. Christie

It is hereby certified that error appears in the printed specification of the above numbered patent requiring correction and that the said Letters Patent should read as corrected below.

Column 3, line 25, for "places" read -- plates --; column 6, list of References Cited, under UNITED STATES PATENTS, add the following:

2,682,801 Davidson et al. ------ July 6, 1954

Signed and sealed this 27th day of September 1960.

(SEAL)
Attest:
KARL H. AXLINE
Attesting Officer

ROBERT C. WATSON
Commissioner of Patents